(12) United States Patent
Baumann et al.

(10) Patent No.: US 8,915,152 B2
(45) Date of Patent: Dec. 23, 2014

(54) FORCE SENSOR WITH WINGS AND FORCE DISTRIBUTION COMPONENT

(75) Inventors: Marc Baumann, Freiburg (DE); Patrick Ruther, Karlsruhe (DE); Alexander Peter, Offenburg (DE); Oliver Paul, Au (DE)

(73) Assignees: Micronas GmbH, Freiburg (DE); Albert-Ludwigs-Universitaet Frieburg, Freiburg (DE)

( * ) Notice: Subject to any disclaimer, the term of this patent is extended or adjusted under 35 U.S.C. 154(b) by 101 days.

(21) Appl. No.: 13/614,731

(22) Filed: Sep. 13, 2012

(65) Prior Publication Data

US 2013/0061691 A1 Mar. 14, 2013

Related U.S. Application Data

(60) Provisional application No. 61/548,496, filed on Oct. 18, 2011.

(30) Foreign Application Priority Data

Sep. 13, 2011 (DE) .......................... 10 2011 112 935

(51) Int. Cl.
*G01L 1/10* (2006.01)
*G01L 1/18* (2006.01)
*G01L 9/00* (2006.01)

(52) U.S. Cl.
CPC ................. *G01L 1/18* (2013.01); *G01L 9/0054* (2013.01)
USPC ............. 73/862.625; 73/862.632; 73/862.636

(58) Field of Classification Search
CPC ......... G01K 13/002; G01K 7/01; G01K 1/14; G01K 1/024; G01K 1/16; G01K 7/42; G01K 7/22; G01K 7/16; G01K 7/183; G01K 7/20; G01K 1/08; G01K 13/02; G01K 1/143; H01F 27/402; G06F 1/206
USPC ................. 374/100, 152, 163, 185, 208, 158, 374/E01.011; 73/862.625–862.639
See application file for complete search history.

(56) References Cited

U.S. PATENT DOCUMENTS 3,417,361 A * 12/1968 Heller et al. .................... 338/42
4,129,042 A 12/1978 Rosvold
(Continued)

FOREIGN PATENT DOCUMENTS

| CN | 2888651 Y | 4/2007 |
|---|---|---|
| CN | 201935780 U | 8/2011 |

(Continued)

*Primary Examiner* — Max Noori
(74) *Attorney, Agent, or Firm* — Muncy, Geissler, Olds & Lowe, P.C.

(57) ABSTRACT

A force sensor comprising a substrate, a semiconductor body, and a piezoresistive element provided on a top surface of the semiconductor body. The semiconductor body is connected to the substrate in a force-fit manner, and includes a first wing which is provided on the top surface of the semiconductor body and being connected to the semiconductor body in a force-fit manner. A first force application area is provided on the first wing. A second wing has a second force application area provided opposite the first wing. The piezoresistive element is disposed between the first wing and the second wing. A force distribution component is connected to the first force application area and the second force application area in a force-fit manner. The force distribution component having a first surface which is oriented away from the top surface of the semiconductor body and includes a third force application area.

15 Claims, 4 Drawing Sheets

(56) References Cited

U.S. PATENT DOCUMENTS

| | | | |
|---|---|---|---|
| 4,359,498 A * | 11/1982 | Mallon et al. | 428/156 |
| 5,024,097 A | 6/1991 | Graeger et al. | |
| 5,600,074 A | 2/1997 | Marek et al. | |
| 5,877,425 A * | 3/1999 | Suzuki et al. | 73/727 |
| 6,005,275 A * | 12/1999 | Shinogi et al. | 257/417 |
| 6,346,742 B1 * | 2/2002 | Bryzek et al. | 257/704 |
| 7,331,241 B1 * | 2/2008 | Kurtz et al. | 73/753 |
| 7,631,559 B2 * | 12/2009 | Mochida | 73/514.36 |
| 8,378,435 B2 * | 2/2013 | Lo et al. | 257/415 |
| 8,445,978 B2 * | 5/2013 | Perruchot et al. | 257/417 |
| 8,558,328 B2 * | 10/2013 | Legat et al. | 257/415 |
| 2005/0190152 A1 | 9/2005 | Vaganov | 345/157 |
| 2005/0217386 A1* | 10/2005 | Hirose et al. | 73/763 |
| 2007/0234827 A1* | 10/2007 | Hirose et al. | 73/862.627 |
| 2007/0245836 A1* | 10/2007 | Vaganov | 73/862.621 |
| 2007/0266797 A1 | 11/2007 | Hirabayashi et al. | |
| 2008/0047352 A1* | 2/2008 | Kurtz et al. | 73/753 |
| 2008/0223143 A1* | 9/2008 | Murari et al. | 73/727 |
| 2008/0236292 A1* | 10/2008 | Reijs | 73/727 |
| 2010/0170349 A1 | 7/2010 | Hatanaka et al. | |
| 2013/0087866 A1* | 4/2013 | Senf | 257/419 |

FOREIGN PATENT DOCUMENTS

| | | |
|---|---|---|
| DE | 37 02 412 A1 | 8/1988 |
| DE | 41 37 624 A1 | 5/1993 |
| EP | 0 427 261 A2 | 5/1991 |
| GB | 2 207 804 A | 2/1989 |
| WO | WO 92/15851 | 9/1992 |

\* cited by examiner

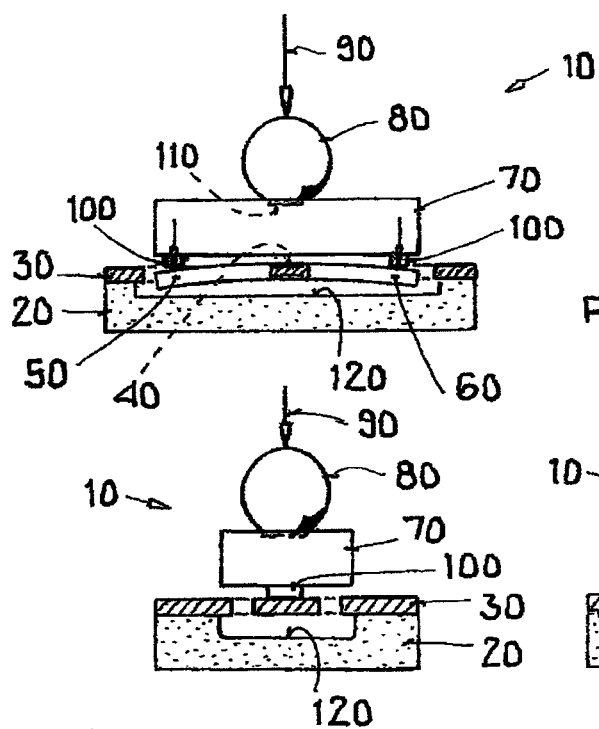
FIG. 7
FIG. 8
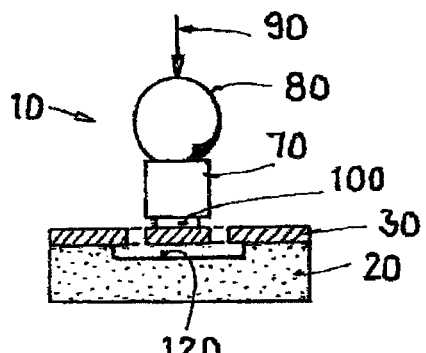
FIG. 9

FORCE SENSOR WITH WINGS AND FORCE DISTRIBUTION COMPONENT

This nonprovisional application claims priority to German Patent Application No. DE 10 2011 112 935.2, which was filed in Germany on Sep. 13, 2011, and to U.S. Provisional Application No. 61/548,496, which was filed on Oct. 18, 2011, and which are both herein incorporated by reference.

BACKGROUND OF THE INVENTION

1. Field of the Invention

The present invention relates to a force sensor.

2. Description of the Background Art

A force sensor having a piezoresistive element is known from DE 41 37 624, which corresponds to U.S. Pat. No. 5,600,074. Among other things, this publication discloses a wing-like configuration in which an application of force is provided in the vicinity of the wing abutment. An integrated circuit is furthermore disposed on the outer end of the wing. By applying force close to the abutment, an attempt is made to keep the integrated circuit as free of mechanical stress as possible.

SUMMARY OF THE INVENTION

It is therefore an object of the present invention to provide a device which refines the prior art.

According to an embodiment, a force sensor is disclosed that includes a substrate which has a front side and a back side and a semiconductor body which has a top surface and a back surface, and which has a piezoresistive element provided on the top surface of the semiconductor body, wherein the semiconductor body is connected to the substrate in a force-fit manner, the force sensor also includes a first wing provided on the top surface of the semiconductor body, having an upper side and a bottom side, the wing being largely elastically movable along the normal vector of the semiconductor top surface, and the wing being connected to the semiconductor body in a force-fit manner, and the semiconductor body being designed as an abutment upon a movement of the wing, and a first force application area being provided on the wing, a second wing having a second force application area being provided opposite the first wing, and the piezoresistive element being disposed between the first wing and the second wing, and a force distribution component designed in the form of a bridge being connected to the first force application area and the second force application area in a force-fit manner, the force distribution component having a first surface which has a third force application area facing away from the surface of the semiconductor body. It should be noted that it is advantageous to dispose the force application area at the outer end of the first wing and the second wing. In this case, the outer end is understood to be the end of the wing which is disposed opposite the abutment of the relevant wing. In should be noted that an electrical voltage is generated by the piezoresistive element when the wing is deflected.

One advantage of the device according to the invention is that known process steps from CMOS production may be used for manufacturing the force sensor. The force sensor may be easily integrated thereby into the manufacturing process of an integrated circuit. By pressing on two wings substantially simultaneously with the aid of the bridge-like force distribution component and elastically deflecting the two wings, and by disposing the piezoresistive element between the two wings, the force sensor has a higher sensitivity than the previous single-wing force sensors. In addition, the measurable range of forces is expanded. Studies have shown that the force sensor is insensitive to adjustment errors of the force distribution component; in particular, a lateral movement of the force distribution component in the direction of the longitudinal axis of the wing only slightly affects the sensitivity of the force sensor. In addition, the third force application area may be moved along the longitudinal axis of the force distribution component, which has only a slight influence on the sensitivity of the force sensor.

In an embodiment, an integral connection can be provided at least partially between the front side of the substrate and the back surface of the semiconductor body. The substrate is preferably designed as a glass body or a glass plate. It is furthermore preferable for the semiconductor body to be made of silicon.

In an embodiment, the third force application area can be provided midway between the first force application area and the second force application area. This makes it possible to achieve a very symmetrical distribution of force to the two wings. In one advantageous specific embodiment, the force application area has a formation for accommodating a force application component. The formation, which can be designed as a cavity, extremely preferably as a hole in the shape of a truncated cone, may be used to specify the position of the third force application area. In an embodiment, the force application component can be designed in the shape of a sphere and is preferably made of steel.

The flexural strength of the force distribution component can be greater than the flexural strength of the first wing and the flexural strength of the second wing. This guarantees an optimum transmission of force to the wings and increases the sensitivity of the force sensor. The force distribution component preferably has an area designed in the shape of a bar. The rigidity is easily increased, due to the bar-shaped formation. The force distribution component can include silicon.

According to an embodiment, intermediate pieces can be provided between the force distribution component and the first force application area and the second force application area. The intermediate pieces are also referred to as spacers. This makes it possible to set or increase the distance of a middle area of the force distribution component from the piezoresistive element. If the wings bend as a result of an application of force, the spacers may be used, among other things, to prevent the middle area of the force distribution component from sitting on the surface of the piezoresistive element or the semiconductor surface even if the wings bend a great deal.

According to an embodiment, the part of the semiconductor body located between the first wing and the second wing an be designed as a self-supporting, plate-shaped structure and accommodates the piezoresistive sensor. It is preferred to connect the plate-shaped structure to the semiconductor body, which is disposed outside the self-supporting structure, on two opposite sides, and to have the first wing and the second wing and the self-supporting structure form a configuration in the shape of a cross. To provide the self-supporting structure, a cavity may be provided beneath the wings on the front side of the substrate.

In another embodiment, a spacer is inserted between the substrate and the semiconductor body, so that a structured area for providing at least one cavity is not provided on either the front of the substrate or on the back surface of the semiconductor body.

According to an embodiment, the first wing and the second wing can be supported on the substrate. One advantage is that very strong forces may be measured if the wings are supported on the substrate. It is furthermore preferred to integrally connect the first wing and the second wing to the substrate. In addition, according to an embodiment, the part of the semiconductor body accommodating the piezoresistive element is supported on the substrate. If a force is now transmitted to the substrate by means of the wings, the substrate is deformed into a convex shape by the wings, and stress is induced in the piezoresistive element.

In another embodiment, the first wing and the second wing and the semiconductor body are designed as a single piece. One advantage is that a structure of this type may be produced particularly easily and economically using standard processes of semiconductor manufacturing. In particular, dry etching processes, for example deep trench etching processes, are suitable for forming the trenches between the wing edges and the semiconductor body.

According to an embodiment, the distance from the bottom side of the first wing and from the bottom side of the second wing to the substrate is used as a limit of the deflection of the wing in question. The distance may be set according to the elastic properties of the wings and/or the range of forces to be measured. The reliability of the force sensor is greatly improved hereby. In an alternative embodiment, a formation is disposed on the force distribution component. The deflection of the first wing and the second wing may be limited by means of the formation or, in other words, by means of a stop. Starting at a predefined force, the formation strikes the top surface of the semiconductor body and prevents further deflection of the first wing and the second wing.

In an embodiment, an integrated circuit is provided on the top surface of the semiconductor body, apart from the first wing and apart from the second wing. The integrated circuit thus has an operative electrical connection to the piezoresistive element. One advantage is that no mechanical stresses caused by the external force act upon the integrated circuit, and the integrated circuit evaluates the electrical voltage generated by the piezoresistive element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7 shows a cross-sectional view in the longitudinal direction of a force sensor under the influence of an application of force;

FIG. 8 shows a cross-sectional view in the longitudinal direction of a force sensor under the influence of an application of force, including a first specific embodiment of an integrated overload protection system; and FIG. 9 shows a cross-sectional view in the longitudinal direction of a force sensor under the influence of an application of force, including a second specific embodiment of an integrated overload protection system.

DETAILED DESCRIPTION

Figures 1, 2:
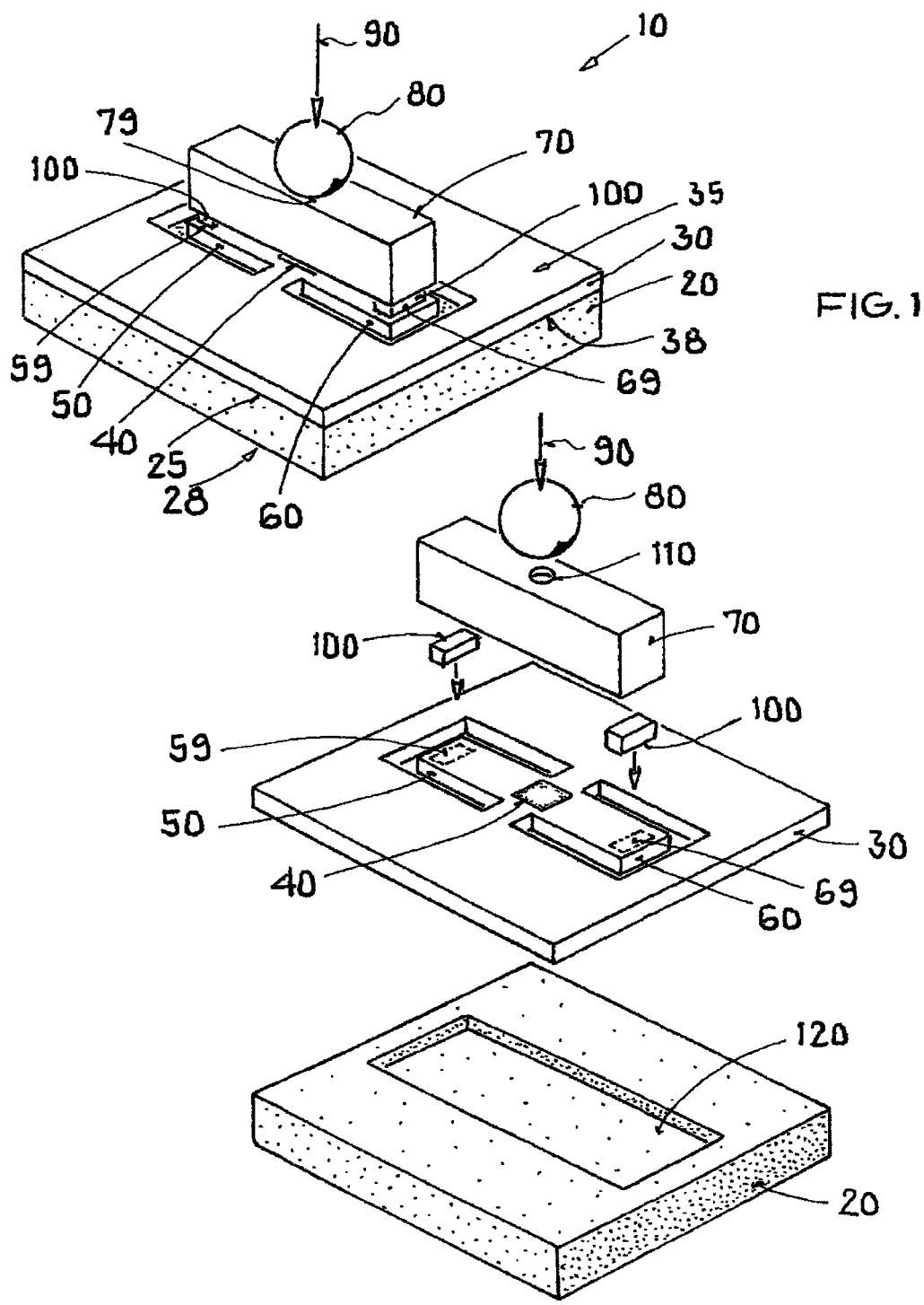
FIG. 1 shows a force sensor according to an embodiment of the present invention.
FIG. 2 shows an exploded view of the force sensor from FIG. 1.

The illustration in FIG. 1 shows an embodiment of a force sensor 10 according to the invention, which comprises a substrate 20 having a front side 25 and a back side 28, and comprising a semiconductor body 30 having a top surface 35 and a back surface 38, and comprising a piezoresistive element 40 provided on top surface 35 of semiconductor body 30, the semiconductor body being connected to substrate 20 in a force-fit manner. Force sensor 10 furthermore has a first wing 50, first wing 50 being provided on top surface 35 of semiconductor body 30 and having an upper side and bottom side. First wing 50 is largely elastically movable along the normal vector of top surface 35 of semiconductor body 30, wherein first wing 50 is connected to semiconductor body 30 in a force-fit manner, and wherein semiconductor body 30 is designed as an abutment upon a movement of the wing. A first force application area 59 is provided on first wing 50.

Force sensor 10 furthermore has a second wing 60 which is disposed opposite first wing 50. A second force application area 69 is provided on the upper side of second wing 60. Like first wing 50, second wing 60 is largely elastically movable along the normal vector of top surface 35 of semiconductor body 30, and second wing 60 is connected to semiconductor body 30 in a force-fit manner, so that semiconductor body 30 is designed as an abutment upon a movement of second wing 60. First wing 50 and second wing 60 and semiconductor body 30 are designed as a single piece and are preferably made of silicon. First wing 50 and second wing 60 furthermore have largely the same external shape, first force application area 59 being situated on the outer end of first wing 50, and second force application area 69 being situated on the outer end of second wing 60.

Piezoresistive element 40 is disposed between first wing 50 and second wing 60. A force distribution component 70, which is designed in the shape of a bridge and is connected to first force application area 59 and second force application area 69 in a force-fit manner, is furthermore provided, force distribution component 70 including a first surface which has a third force application area 79 and faces away from top surface 35 of semiconductor body 30. Third force application area 79 is preferably provided midway between first force application area 59 and second force application area 69.

A force application component 80 is disposed on third force application area 79. Force application component 80 can have a spherical design and is preferably made of steel. The direction of the force which is applied to the force sensor during a force measurement is illustrated by an arrow 90. An intermediate piece 100 is provided between each of force distribution component 70, which is preferably designed in the shape of a bar and is preferably made of silicon, and first force application area 59 and second force application area 69. Intermediate piece 100 is preferably made of gold.

It is understood that the flexural strength of force distribution component 70 is greater than the flexural strength of first wing 50 and the flexural strength of second wing 60. The greater the rigidity of force distribution component 70 in comparison to the rigidity of first wing 50 and second wing 60, respectively, the better the transfer of force to the two wings and the buildup of mechanical stress within piezoresistive element 40.

The illustration in FIG. 2 shows an exploded view of force sensor 10 from FIG. 1. Only the differences from the view in FIG. 1 are explained below. On the first surface of force distribution component 70, third force application area 79 is designed as a first cavity 110 for accommodating force application component 80. A second cavity 120 is furthermore provided on front side 25 of substrate 20. The lateral dimensions of second cavity 120 are selected in such a way that first wing 50 and second wing 60 and the area of semiconductor body 30 between first wing 50 and second wing 60, which accommodates piezoresistive element 40, form a self-supporting, plate-shaped structure. The plate-shaped structure is connected to semiconductor body 30, which is disposed outside the self-supporting structure, on two opposite sides, so that first wing 50 and second wing 60 and the self-supporting structure form a configuration in the shape of a cross. Semiconductor body 30 has a plate-shaped formation, i.e., the thickness of the two wings corresponds to the thickness of semiconductor body 30.

Figures 3, 4:
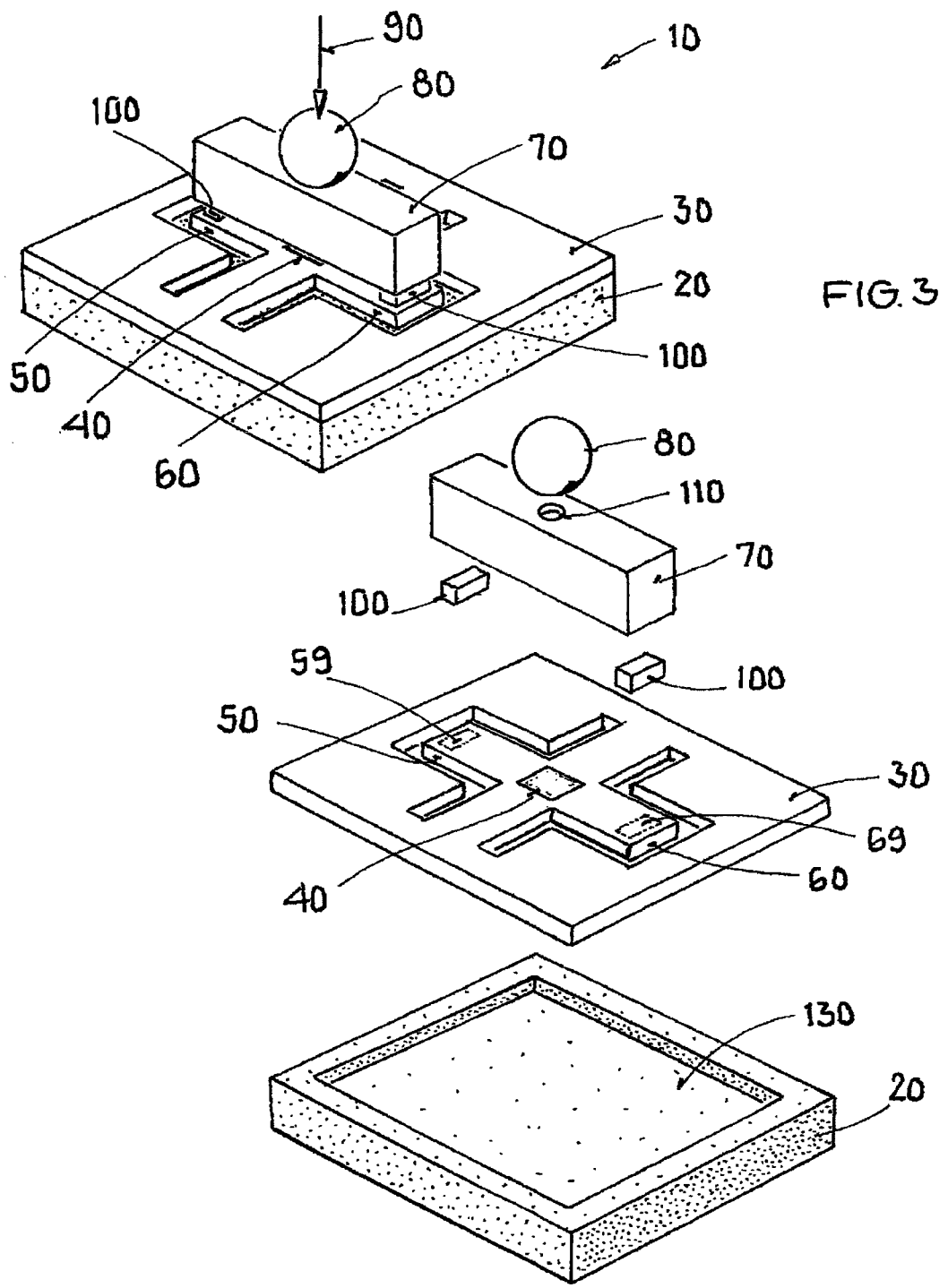
FIG. 3 shows a force sensor according to an embodiment of the invention.
FIG. 4 shows an exploded view of the force sensor from FIG. 3.

The illustration in FIG. 3 shows a second embodiment of force sensor 10. In addition, FIG. 4 shows an exploded view of the force sensor from FIG. 3. Only the differences between the illustrations in FIG. 3 and FIG. 4 and the illustration in the preceding figures are explained below. A third cavity 130 is provided on front side 25 of substrate 20. The lateral dimensions of third cavity 130 are selected in such a way that first wing 50 and second wing 60 and the entire slotted area of semiconductor body 30 between first wing 50 and second wing 60 are self-supporting. The plate-shaped structure, which is designed to have a particularly pronounced cross shape, is connected to semiconductor body 30 on two opposite sides outside the self-supporting structure.

Figure 5:
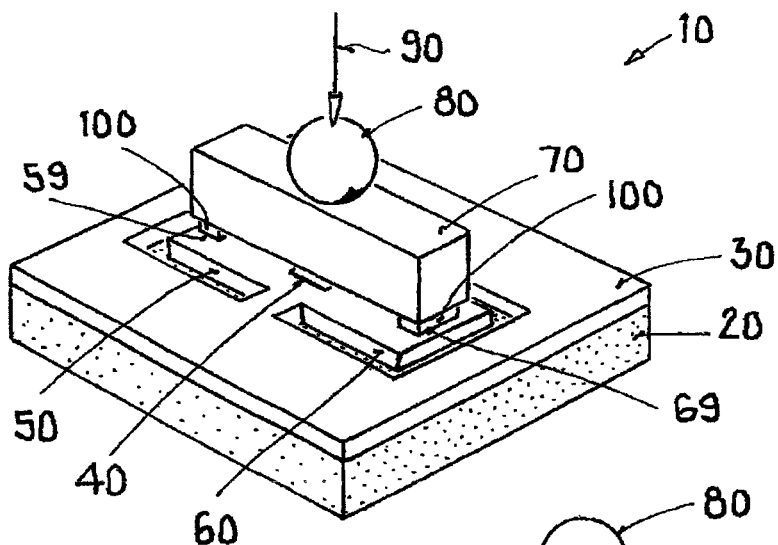
FIG. 5 shows a force sensor for measuring high forces.
Figure 6:
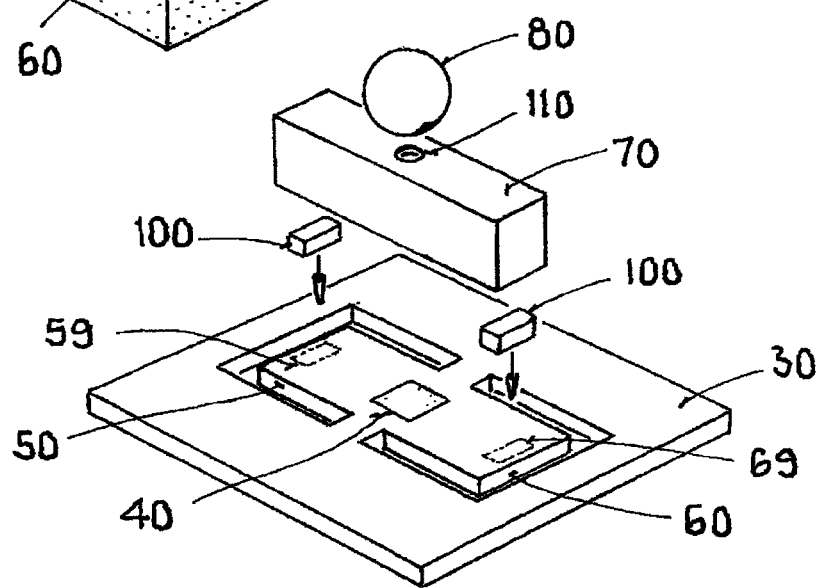
FIG. 6 shows an exploded view of the force sensor from FIG. 5.
Figure 6:
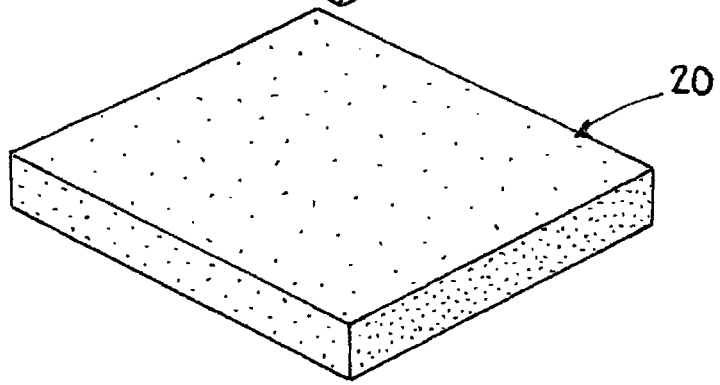

The illustration in FIG. 5 shows an embodiment of force sensor 10 for measuring strong forces. In addition, FIG. 6 shows an exploded view of the force sensor from FIG. 5. Only the differences between the illustrations in FIG. 5 and FIG. 6 and the illustration in the preceding figures are explained below. In this case, no cavity is provided on front side 25 of substrate 20. As a result, first wing 50 and second wing 60 and the entire back surface 38 of semiconductor body 30 are supported on front side 25 of substrate 20. When force is applied via first wing 50 and second wing 60, substrate 20 and semiconductor body 30 are directly bent into a convex shape. A force sensor of this type may be manufactured particularly economically. It is understood that substrate 20 has a sufficient elasticity.

The illustration in FIG. 7 shows a cross-sectional view in the longitudinal direction of force sensor 10 of the embodiment in FIG. 1, under the influence of an application of force. It is apparent that both wings are deflected by means of the symmetrical configuration of the wings and build a great mechanical stress on the piezoresistive element.

The illustration in FIG. 8 shows a cross-sectional view of a section perpendicular to the longitudinal direction of force sensor 10. Only the differences from the illustrations in the preceding figures are explained below. In this case, the width of force distribution component 70 is selected to be greater than the width of the two wings, so that the wings are pressed into the formation of substrate 20 only up to a predetermined depth under the influence of an application of force, i.e., force distribution component 70 strikes top surface 35 of semiconductor body 30. Force sensor 10 thus has an integrated overload protection system.

The illustration in FIG. 9 shows another cross-sectional view of a section perpendicular to the longitudinal direction of force sensor 10. Only the differences from the illustrations in the preceding figures are explained below. In this case, the width of force distribution component 70 is selected to be less than the width of the two wings. However, the depth of the formation, i.e., the depth of second cavity 120 or the depth of third cavity 130 in substrate 20, is selected to be small, such that the wings are pressed into the formation of substrate 20 only up to the predetermined depth under the influence of the application of force. The ends of the wings subsequently strike substrate 20. This makes it possible to provide a second type of integrated overload protection system for force sensor 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A force sensor comprising:
   a substrate that has a front side and a back side;
   a semiconductor body that has a top surface and a back surface, a piezoresistive element being arranged on the top surface of the semiconductor body, the semiconductor body being connected to the substrate, the semiconductor body including:
      a first wing provided on the top surface of the semiconductor body, the first wing having a upper side and a bottom side, the first wing being largely elastically movable along a normal vector of the top surface of the semiconductor body, the first wing being connected to the semiconductor body, the semiconductor body being configured as an abutment upon a movement of the first wing;
      a first force application area being arranged on the first wing; and
      a second wing situated opposite the first wing is arranged with a second force application area, the piezoresistive element being disposed between first wing and second wing; and
   a force distribution component configured in a shape of a bridge and being connected to the first force application area and the second force application area, the force distribution component including a first surface that has a third force application area and faces away from the top surface of the semiconductor body.

2. The force sensor according to claim 1, wherein the first wing and the second wing have largely the same external shape, wherein the first force application area is arranged on an outer end of the first wing, wherein the second force application area is arranged on an outer end of the second wing, and wherein the second force application area is arranged on the outer end of the second wing.

3. The force sensor according to claim 1, wherein the third force application area is provided midway between the first force application area and the second force application area, and wherein the third force application area has a formation for accommodating a force application component.

4. The force sensor according to claim 3, wherein the force application component has a spherical design and is made of steel.

5. The force sensor according to claim 1, wherein a flexural strength of the force distribution component is greater than a flexural strength of the first wing and a flexural strength of the second wing.

6. The force sensor according to claim 1, wherein the force distribution component has an area in the shape of a bar.

7. The force sensor according to claim 1, wherein an intermediate piece is arranged between the force distribution component and the first force application area and the second force application area.

8. The force sensor according to claim 1, wherein a part of the semiconductor body that is located between the first wing and the second wing is is connected to a side part of the semiconductor body, has a structure in a plate shape and accommodates the piezoresistive element.

9. The force sensor according to claim 8, wherein the part of the semiconductor body is connected to two opposite sides, and wherein the first wing, the second wing and the part of the semiconductor body form a configuration in the shape of a cross.

10. The force sensor according to claim 8, wherein the first wing and the second wing are supported on the substrate.

11. The force sensor according to claim 1, wherein the first wing and the second wing and the semiconductor body are a single piece.

12. The force sensor according to claim 1, wherein a distance from the bottom side of the first wing and from the bottom side of the second wing to the substrate limits a deflection of the first or second wing.

13. The force sensor according to claim 1, wherein a formation is arranged on the force distribution component, and wherein a deflection of the first wing is limited by the formation.

14. The force sensor according to claim 1, wherein the force distribution component includes silicon.

15. The force sensor according to claim 1, wherein an integrated circuit is provided on the top surface of the semiconductor body apart from the first wing and apart from the second wing, and wherein the integrated circuit has an operative electrical connection to the piezoresistive element.

* * * * *